United States Patent
Steger

(10) Patent No.: US 7,062,093 B2
(45) Date of Patent: Jun. 13, 2006

(54) SYSTEM AND METHOD FOR OBJECT RECOGNITION

(75) Inventor: Carstan Steger, Eching (DE)

(73) Assignee: MVTECH Software GmbH, Munich (DE)

(*) Notice: Subject to any disclaimer, the term of this patent is extended or adjusted under 35 U.S.C. 154(b) by 887 days.

(21) Appl. No.: 09/965,236

(22) Filed: Sep. 26, 2001

(65) Prior Publication Data

US 2002/0057838 A1 May 16, 2002

(30) Foreign Application Priority Data

Sep. 27, 2000 (EP) .............................. 00120269
Nov. 14, 2000 (EP) .............................. 00124295

(51) Int. Cl.
*G06K 9/62* (2006.01)

(52) U.S. Cl. ....................................... 382/216; 382/218
(58) Field of Classification Search ................ 382/215, 382/216, 240, 217, 218
See application file for complete search history.

(56) References Cited

U.S. PATENT DOCUMENTS

| | | | | | |
|---|---|---|---|---|---|
| 4,799,270 | A | * | 1/1989 | Kim et al. | 382/205 |
| 4,972,359 | A | | 11/1990 | Silver et al. | 364/728.05 |
| 5,323,470 | A | * | 6/1994 | Kara et al. | 382/103 |
| 5,550,933 | A | | 8/1996 | Stetten | 382/199 |
| 5,631,981 | A | | 5/1997 | Rao | 382/278 |
| 6,005,978 | A | | 12/1999 | Garakani | 382/218 |
| 6,023,530 | A | | 2/2000 | Wilson | 382/219 |
| 6,272,247 | B1 | * | 8/2001 | Manickam et al. | 382/217 |
| 6,546,137 | B1 | * | 4/2003 | Lai et al. | 382/217 |

OTHER PUBLICATIONS

Cootes et al. "Multi–Resolution Search with Active Shape Models." Proc. 12$^{th}$ IAPR Int. Conf. on Pattern Recognition, vol. 1, conference A: Computer Vision & Image Processing, vol. 1, Oct. 9, 1994, pp. 610–612.*

Toyama et al. "Model–Based Pose Estimation Using Genetic Algorithm." Proc. 14$^{th}$ Int. Conf. on Pattern Recognition, vol. 1, Aug. 16, 1998, pp. 198–201.*

EPO Office Letter/Search Report, Mar. 7, 2001.

Hashimoto: High–Speed Template Matching Algorithm Using Information of Contour Points Systems & Computers in Japan, US, Scripta Technical Journals. New York vol. 23, No. 9, 1992, pp. 78–87, XP000334342 ISSN: 0882–1666, Chapters 2,5.

Cambridge University Press Numerical Recipes In C: The Art of Scientific Computing (ISSN–521–43108–5), 1988–92.

(Continued)

*Primary Examiner*—Jon Chang
(74) *Attorney, Agent, or Firm*—Abelman, Frayne Schwab

(57) ABSTRACT

A system and method recognize a user-defined model object within an image. The system and method recognize the model object with occlusion when the model object to be found is only partially visible. The system and method also recognize the model object with clutter when there may be other objects in the image, even within the model object. The system and method also recognize the model object with non-linear illumination changes as well as global or local contrast reversals. The model object to be found may have been distorted, when compared to the user-defined model object, from geometric transformations of a certain class such as translations, rigid transformations by translation and rotation, arbitrary affine transformations, as well as similarity transformations by translation, rotation, and scaling.

20 Claims, 7 Drawing Sheets

OTHER PUBLICATIONS

Shang–Hong Lai & Ming Fang An accurate and Fast Pattern Localization Algorithm for Automated Visual Inspection; Real–Time Imaging 5, 3–14 (1999).

Carsten Steger An Unbiased Detector of Curvilinear Structures, Feb. 1998.

Lisa Gottesfeld Brown A Survey of Image Registration Techniques; Department of Computer Science, Columbia University, New York, NY 10027; Dec. 1992.

Steven L. Tanimoto, Template Matching in Pyramids; Dept. Computer Science, University of Washington, Seattle, Washington 98195; Jun. 11, 1980.

William J. Rucklidge Efficiently Locating Objects Using the Hausdorff Distance; Int'l Journal of Computer Vision 24(3), pp. 251–270.

D.H. Ballard Generalizing The Hough Transform To Detect arbitrary Shapes; Pattern Recognition, Sep. 23, 1980.

Olson, Clark F. & Huttenlocher, Daniel P. Automatic Target Recognition by Matching Oriented Edge Pixels; IEEE Transaction on Image Processing, Jan. 1997.

Hartley, Richard & Zisserman, Andrew Multiple View Geometry in Computer Vision; Cambridge Press.

Canny, John A Computational Approach to Edge Detection; reprinted from IEEE Transactions on Pattern Analysis and Machine Intelligence, Nov. 1986.

Andreas Busch Fast Recognition of Lines in Digital Images Without User–Supplied Parameters; Institut fur Angewandte Geodosiei.

Bunilla Borgefors Hierarchical Chamfer Matching: A Parametric Edge Matching Algorithm; Transactions on Analysis and Machine Intelligence, vol. 10, No. 6, Nov. 1988.

15.5 Nonlinear Models; Recipes in Numerical C Cambridge University Press 1988–1992.

Wolfgang Forstner *A Framework for Low Level Feature Extraction* Lecture Note in Computer Science vol. 801.

Wallack, A. and Mahocha, D. *Robust Algorithms for Object Localization* International Journal of Computer Vision 27(3), 243–263 (1998).

Carsten Steger Subpixel–Precise Extraction of Lines and Edges; ISPRS, vol. XXXIII 2000.

* cited by examiner

SYSTEM AND METHOD FOR OBJECT RECOGNITION

FIELD OF THE INVENTION

This invention relates generally to machine vision systems, and more particularly, to visual recognition of objects under partial occlusion, clutter, or non-linear contrast changes.

BACKGROUND OF THE INVENTION

In object recognition, and in particular in many machine vision tasks, one is interested in recognizing a user-defined model object in an image. The object in the image may have undergone arbitrary transformations of a certain class of geometric transformations. If the class of transformations is the class of translations, one is interested in obtaining the position of the model in the image. The class of translations is typically used if it can be ensured that the model always occurs in the same rotation and size in the image, e.g., because it is mounted at a fixed angle on a x-y-stage and the camera is mounted in a fixed position perpendicular to the stage. If the class of transformations is the class of rigid transformations, additionally the rotation of the object in the image is desired. This class of transformations can, for example, be used if the camera is mounted perpendicular to the stage, but the angle of the object cannot be kept fixed. If the class of transformations is the class of similarity transformations, additionally the size of the object in the image may vary. This class of transformations can occur, for example, if the distance between the camera and the object cannot be kept fixed or if the object itself may undergo size changes. If neither the position nor the 3D rotation of the camera with respect to the object can be kept fixed, the object will undergo a general perspective transformation in the image. If the interior orientation of the camera is unknown, a perspective projection between two planes (i.e., the surface of the object and the image plane) can be described by a 3×3 matrix in homogeneous coordinates:

$$\begin{pmatrix} x' \\ y' \\ t' \end{pmatrix} = \begin{pmatrix} p_{11} & p_{12} & p_{13} \\ p_{21} & p_{22} & p_{23} \\ p_{31} & p_{32} & p_{33} \end{pmatrix} \begin{pmatrix} x \\ y \\ t \end{pmatrix}$$

The matrix and vectors are only determined up to an overall scale factor (see Hartley and Zisserman (2000) [Richard Hartley and Andrew Zisserman: Multiple View Geometry in Computer Vision. Cambridge University Press, 2000], chapters 1.1–1.4). Hence, the matrix, which determines the pose of the object, has eight degrees of freedom. If the interior orientation of the camera is known, these eight degrees of freedom reduce to the six degrees of freedom of the pose of the object with respect to the camera (three for translation and three for rotation).

Often, this type of transformation is approximated by a general 2D affine transformation, i.e., a transformation where the output points $(x',y')^T$ are obtained from the input points $(x,y)^T$ by the following formula:

$$\begin{pmatrix} x' \\ y' \end{pmatrix} = \begin{pmatrix} a_{11} & a_{12} \\ a_{21} & a_{22} \end{pmatrix} \begin{pmatrix} x \\ y \end{pmatrix} + \begin{pmatrix} t_x \\ t_y \end{pmatrix}.$$

General affine transformations can, for example, be decomposed into the following, geometrically intuitive, transformations: A scaling of the original x and y axes by different scaling factors $s_x$ and $s_y$, a skew transformation of the y axis with respect to the x axis, i.e., a rotation of the y axis by an angle $\theta$, while the x axis is kept fixed, a rotation of both axes by an angle $\phi$, and finally a translation by a vector $(t_x,t_y)^T$. Therefore, an arbitrary affine transformation can be written as:

$$\begin{pmatrix} x' \\ y' \end{pmatrix} = \begin{pmatrix} \cos\varphi & -\sin\varphi \\ \sin\varphi & \cos\varphi \end{pmatrix} \begin{pmatrix} 1 & -\sin\theta \\ 0 & \cos\theta \end{pmatrix} \begin{pmatrix} s_x & 0 \\ 0 & s_y \end{pmatrix} \begin{pmatrix} x \\ y \end{pmatrix} + \begin{pmatrix} t_x \\ t_y \end{pmatrix}.$$

FIG. 1 displays the parameters of a general affine transformation graphically. Here, a square of side length 1 is transformed into a parallelogram. Similarity transformations are a special case of affine transformations in which the skew angle $\theta$ is 0 and both scaling factors are identical, i.e., $s_x=s_y=s$. Likewise, rigid transformations are a special case of similarity transformations in which the scaling factor is 1, i.e., s=1. Finally, translations are a special case of rigid transformations in which $\phi=0$. The relevant parameters of the class of geometrical transformations will be referred to as the pose of the object in the image. For example, for rigid transformations the pose consists of the rotation angle $\phi$ and the translation vector $(t_x,t_y)^T$. Object recognition hence is the determination of the poses of all instances of the model in the image.

Several methods have been proposed in the art to recognize objects in images. Most of them suffer from the restriction that the model will not be found in the image if it is occluded or degraded by additional clutter objects. Furthermore, most of the existing methods will not detect the model if the image exhibits non-linear contrast changes, e.g., due to illumination changes.

All of the known object recognition methods generate an internal representation of the model in memory at the time the model is generated. To recognize the model in the image, in most methods the model is systematically compared to the image using all allowable degrees of freedom of the chosen class of transformations for the pose of the object (see, e.g., Borgefors (1988) [Gunilla Borgefors. Hierarchical chamfer matching: A parametric edge matching algorithm. *IEEE Transactions on Pattern Analysis and Machine Intelligence*, 10(6):849–865, November 1988], Brown (1992) [Lisa Gottesfeld Brown. A survey of image registration techniques. *ACM Computing Surveys*, 24(4):325–376, December 1992], and Rucklidge (1997) [William J. Rucklidge. Efficiently locating objects using the Hausdorff distance. *International Journal of Computer Vision*, 24(3):251–270, 1997]). For each set of parameters of the pose, a match metric is computed that gives a measure of how well the model fits to the image at the pose under consideration. To speed up the search through the space of allowable transformations, usually image pyramids are used both on the model and the image to reduce the amount of data that needs to be examined (see, e.g., Tanimoto (1981) [Steven L. Tanimoto. Template matching in pyramids. *Computer Graphics and Image Processing*, 16:356–369, 1981], Borgefors (1988), or Brown (1992)).

The simplest class of object recognition methods is based on the gray values of the model and image itself and uses normalized cross correlation as a match metric (see U.S. Pat. No. 4,972,359, U.S. Pat. No. 5,222,155, U.S. Pat. No. 5,583,954, U.S. Pat. No. 5,943,442, U.S. Pat. No. 6,088,483, and Brown (1992), for example). Normalized cross correlation has the advantage that it is invariant to linear brightness changes, i.e., the object can be recognized if it has undergone linear illumination changes. However, normalized cross correlation has several distinct disadvantages. First, it is very expensive to compute, making the methods based on this metric very slow. This leads to the fact that the class of transformations is usually chosen as the class of translations only because otherwise the search would take too much time for real-time applications, even if image pyramids are used. Second, the metric is not robust to occlusions of the object, i.e., the object will usually not be found even if only small parts of it are occluded in the image. Third, the metric is not robust to clutter, i.e., the object will usually not be found if there are disturbances on or close to the object.

Another class of algorithms is also based on the gray values of the model and image itself, but uses either the sum of the squared gray value differences or the sum of the absolute value of the gray value differences as the match metric (see U.S. Pat. No. 5,548,326 and Brown (1992), for example). This metric can be made invariant to linear brightness changes (Lai and Fang (1999) [Shang-Hong Lai and Ming Fang. Accurate and fast pattern localization algorithm for automated visual inspection. *Real-Time Imaging*, 5:3–14, 1999]). Since sums of squared or absolute differences are not as expensive to compute as normalized cross correlation, usually a larger class of transformations, e.g., rigid transformations, are allowed. This metric, however, possesses the same disadvantages as correlation-based methods, i.e., it is not robust to occlusion or clutter.

A more complex class of object recognition methods does not use the gray values of the model or object itself, but uses the edges of the object for matching. During the creation of the model, edge extraction is performed on the model image and its derived image pyramid (see, e.g., Borgefors (1988), Rucklidge (1997), and U.S. Pat. No. 6,005,978). Edge extraction is the process of converting a gray level image into a binary image in which only the points corresponding to an edge are set to the value 1, while all other pixels receive the value 0, i.e., the image is actually segmented into an edge region. Of course, the segmented edge region need not be stored as a binary image, but can also be stored by other means, e.g., runlength encoding. Usually, the edge pixels are defined as the pixels in the image where the magnitude of the gradient is maximum in the direction of the gradient. Edge extraction is also performed on the image in which the model is to be recognized and its derived image pyramid. Various match metrics can then be used to compare the model to the image. One class of match metrics is based on measuring the distance of the model edges to the image edges under the pose under consideration. To facilitate the computation of the distances of the edges, a distance transform is computed on the image pyramid. The match metric in Borgefors (1988) computes the average distance of the model edges and the image edges. Obviously, this match metric is robust to clutter edges since they do not occur in the model and hence can only decrease the average distance from the model to the image edges. The disadvantage of this match metric is that it is not robust to occlusions because the distance to the nearest edge increases significantly if some of the edges of the model are missing in the image. The match metric in Rucklidge (1997) tries to remedy this shortcoming by calculating the k-th largest distance of the model edges to the image edges. If the model contains n points, the metric hence is robust to 100*k/n % occlusion. Another class of match metrics is based on simple binary correlation, i.e., the match metric is the average of all points in which the model and the image under the current pose both have an edge pixel set (see U.S. Pat. Nos. 6,005,978 and 6,111,984, for example). To speed up the search for potential instances of the model, in U.S. Pat. No. 6,005,978 the generalized Hough transform (Ballard (1981) [D. H. Ballard. Generalizing the Hough transform to detect arbitrary shapes. *Pattern Recognition*, 13(2):111–122, 1981]) is used. This match metric has the disadvantage that the alignment between the edges in the model and the edges in the image needs to be very good to return the correct value of the match metric under the pose under consideration. A complex scheme is used to make the edges in the image broader to achieve the correct match metric. Finally, edges are sometimes used to define the relevant points to use for correlation-based approaches (see U.S. Pat. Nos. 6,023,530 and 6,154,567). Obviously, these approaches have the same drawbacks as the above mentioned correlation-based schemes since the match metric is the same or very similar. All of these match metrics have the disadvantage that they do not take into account the direction of the edges. In U.S. Pat. No. 6,005,978, the edge direction enters the method through the use of the generalized Hough transform, but is disregarded in the match metric. It is well known, however, that disregarding the edge direction information leads to many false positive instances of the model in the image, i.e., found models that are not true instances of the model (Olson and Huttenlocher (1997) [Clark F. Olson and Daniel P. Huttenlocher. Automatic target recognition by matching oriented edge pixels. *IEEE Transactions on Image Processing*, 6(1):103–113, January 1997]). For this reason, some approaches integrate edge direction information into the match metric (see U.S. Pat. Nos. 5,550,933, 5,631,981, 6,154,566, and Hashimoto et al. (1992) [Manabu Hashimoto, Kazuhiko Sumi, Yoshikazu Sakaue, and Shinjiro Kawato. High-Speed Template Matching Algorithm Using Information of Contour Points. *Systems and Computers in Japan*, 23(9):78–87, 1992], for example). However, these approaches do not use image pyramids to speed up the search (which makes the runtime prohibitively large) and only compute the translation of the model. In all the above mentioned approaches, since the image itself is binarized, the match metric is only invariant against a narrow range of illumination changes. If the image contrast is lowered, progressively fewer edge points will be segmented, which has the same effects as progressively larger occlusion.

Evidently, the state-of-the-art methods for object recognition possess several shortcomings. None of the approaches is robust against occlusion, clutter, and non-linear contrast changes at the same time. Furthermore, often computationally expensive preprocessing operations, e.g., distance transforms or generalized Hough transforms, need to be performed to facilitate the object recognition. In many applications it is necessary that the object recognition step is robust to the types of changes mentioned above. For example, in print quality inspection, the model image is the ideal print, e.g., of a logo. In the inspection, one is interested in determining whether the current print deviates from the ideal print. To do so, the print in the image must be aligned with the model (usually by a rigid transformation). Obviously the object recognition (i.e., the determination of the pose of the print) must be robust to missing characters or parts thereof (occlusion) and to extra ink in the print (clutter). If the illumination cannot be kept constant across the entire field of view, the object recognition obviously must also be robust to non-linear illumination changes. Hence, it is an object of the present invention to provide an improved visual recognition system and method for occlusion- and clutter-invariant object recognition. It is a further object to provide a visual recognition system and method for occlusion-, clutter-, and illumination-invariant object recognition.

These objects are achieved with the features of the claims.

SUMMARY OF THE INVENTION

This invention provides a system and method for object recognition that is robust to occlusion, clutter, and non-linear contrast changes.

The present invention includes a method for recognizing a model object in a first image which includes the steps of:

(a) acquiring in electronic memory the first image of the model object;

(b) transforming the first image of the model object into a multi-level representation consistent with a recursive subdivision of a search space, the multi-level representation including at least the first image;

(c) generating at least one precomputed model of the model object for each level of discretization of the search space, the precomputed model consisting of a plurality of model points with corresponding direction vectors, the model points and direction vectors being generated by an image processing operation that returns a direction vector for at least each model point;

(d) acquiring in electronic memory a current image;

(e) transforming the current image into a multi-level representation consistent with a recursive subdivision of the search space, the multi-level representation including at least the current image;

(f) performing an image processing operation on each transformed image of the multi-level representation that returns a direction vector for a subset of model points within the current image that corresponds to the range of translations for which the at least one precomputed model should be searched;

(g) computing a match metric that uses the direction information of the at least one precomputed model and the transformed image for all possible model poses of the at least one precomputed model in the coarsest discretization level of the search space;

(h) determining those model poses whose match metric exceeds a user-selectable threshold and whose match metric is locally maximal, and generating a list of instances of the at least one precomputed model in the coarsest discretization level of the search space from the model poses and the match metrics;

(i) tracking the instances of the at least one precomputed model in the coarsest discretization level of the search space through the recursive subdivision of the search space until a finest level of discretization is reached; and (j) providing the model pose of the instances of the model object on the finest level of discretization.

The present invention includes a system for recognizing a model object in a first image which includes:

(a) means for acquiring in electronic memory a first image of the model object;

(b) means for transforming the first image of the model object into a multi-level representation consistent with a recursive subdivision of a search space, the multi-level representation including at least the first image;

(c) means for generating at least one precomputed model of the model object for each level of discretization of the search space, the precomputed model consisting of a plurality of model points with corresponding direction vectors, the model points and direction vectors being generated by an image processing operation that returns a direction vector for at least each model point;

(d) means for acquiring in electronic memory a current image;

(e) means for transforming the current image into a multi-level representation consistent with a recursive subdivision of the search space, the multi-level representation including at least the current image;

(f) means for performing an image processing operation on each transformed image of the multi-level representation that returns a direction vector for a subset of model points within the current image that corresponds to the range of translations for which the at least one precomputed model should be searched;

(g) means for computing a match metric that uses the direction information of the at least one precomputed model and the transformed image for all possible model poses of the at least one precomputed model in the coarsest discretization level of the search space;

(h) means for determining those model poses whose match metric exceeds a user-selectable threshold and whose match metric is locally maximal, and generating a list of instances of the at least one precomputed model in the coarsest discretization level of the search space from the model poses and the match metrics;

(i) means for tracking the instances of the at least one precomputed model in the coarsest discretization level of the search space through the recursive subdivision of the search space until a finest level of discretization is reached; and (j) means for providing the model pose of the instances of the model object on the finest level of discretization.

The model of the object to be recognized consists of a plurality of points with a corresponding directional vector, which can be obtained by standard image preprocessing algorithms, e.g., line or edge detection methods. At the time of creation of the model, the model is stored in memory by transforming the model image by a plurality of transformations from the class of geometric transformations by which the model may be distorted, e.g., rigid transformations. To recognize the model in the image, the same preprocessing operations that were used at the time of creation of the model are applied to the image in which the model should be found. Hence, for example if line detection was used to construct the model, line filtering is used on the image under consideration. The object is recognized by computing a match metric for all possible transformations of the model in the image. The match metric takes into account the geometrical information of the model and the image, i.e., the positions and directions of the points in the model and in the image. The match metric can be, for example, the sum of the dot product of one of the (precomputed) transformed models and the preprocessed image, or—in an alternative embodiment—the sum of the normalized dot product of one of the (precomputed) transformed models and the preprocessed image. Since the unnormalized dot product only relies on geometric information, it is not necessary to segment (binarize) the model image and the image in which the model is to be found. This makes the method robust against occlusion and clutter. If the normalized dot product is used as the match metric, it is preferred to segment the model image to obtain those points where the direction information is reliable. Again, the image in which the model is to be found is not segmented, leading to true robustness against arbitrary illumination changes, as well as occlusion and clutter. The location of a model in the image is given by the set of transformations (poses) where the match metric is higher than a certain, user-selectable threshold, and is locally maximal within the class of selected transformations.

To speed up the object recognition process, preferably the space of allowable transformations is searched using a recursive coarse-to-fine strategy.

The parameters of the found instances of the model in the image, e.g., the translation and rotation, can be used to control a robot or any other device that uses such geometric information.

BRIEF DESCRIPTION OF THE DRAWINGS

The following description is presented to enable any person skilled in the art to make and use the invention. Descriptions of specific applications are provided only as examples.

DETAILED DESCRIPTION OF THE PREFERRED EMBODIMENTS OF THE INVENTION

The present invention provides a method for object recognition that is robust to occlusion, clutter, and non-linear contrast changes.

Figure 7:
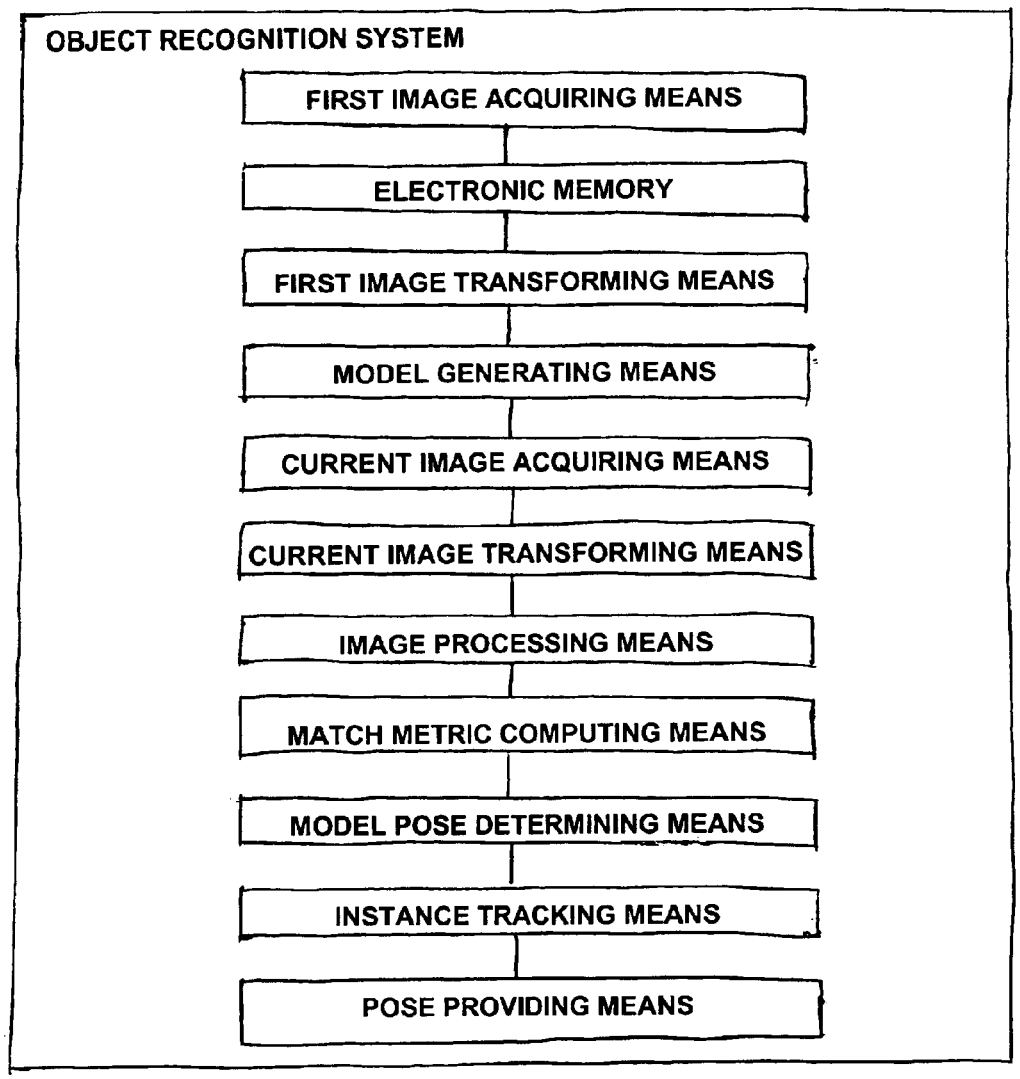
FIG. 7 shows a schematic block diagram of an object recognition system implementing the model generation method of FIGS. 1–6.
Figure 8:
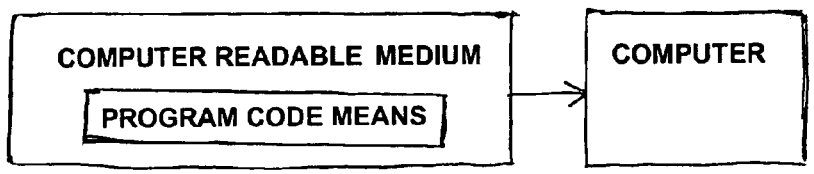
FIG. 8 shows a schematic block diagram of a computer using a computer readable medium to implement the model generation method of FIGS. 1–6.

The present invention also provides an object recognition system shown in FIG. 7 for use with a computer as shown in FIG. 8 to implement the methods described herein in conjunction with FIGS. 1–6.

The system for recognizing a model object in a first image shown in FIG. 7 includes:

(a) means for acquiring in electronic memory a first image of the model object;

(b) means for transforming the first image of the model object into a multi-level representation consistent with a recursive subdivision of a search space, the multi-level representation including at least the first image;

(c) means for generating at least one precomputed model of the model object for each level of discretization of the search space, the precomputed model consisting of a plurality of model points with corresponding direction vectors, the model points and direction vectors being generated by an image processing operation that returns a direction vector for at least each model point;

(d) means for acquiring in electronic memory a current image;

(e) means for transforming the current image into a multi-level representation consistent with a recursive subdivision of the search space, the multi-level representation including at least the current image;

(f) means for performing an image processing operation on each transformed image of the multi-level representation that returns a direction vector for a subset of model points within the current image that corresponds to the range of translations for which the at least one precomputed model should be searched;

(g) means for computing a match metric that uses the direction information of the at least one precomputed model and the transformed image for all possible model poses of the at least one precomputed model in the coarsest discretization level of the search space;

(h) means for determining those model poses whose match metric exceeds a user-selectable threshold and whose match metric is locally maximal, and generating a list of instances of the at least one precomputed model in the coarsest discretization level of the search space from the model poses and the match metrics;

(i) means for tracking the instances of the at least one precomputed model in the coarsest discretization level of the search space through the recursive subdivision of the search space until a finest level of discretization is reached; and (j) means for providing the model pose of the instances of the model object on the finest level of discretization.

The object recognition system of FIG. 7, implementing the methods of FIGS. 1–6, may be provided on a computer program product as shown in FIG. 8, which includes program code means stored on a computer readable medium for performing the methods described herein when the computer program product is run on the computer shown in FIG. 8.

The object recognition system of FIG. 7, implementing the methods of FIGS. 1–6, may be provided as computer program as shown in FIG. 8, which includes program code means for performing all steps of the methods described herein when the computer program is run on the computer shown in FIG. 8.

Match Metric

The model of an object consists of a plurality of points with a corresponding directional vector. Typically, the model is generated from an image of the object, where an arbitrary region of interest (ROI) specifies that part of the image in which the object is located. The ROI can, for example, be specified interactively by the user of the system. Alternatively, the ROI could, for example, be generated by the use of machine vision methods, e.g., various segmentation operations like thresholding, morphology, etc. Details of the model generation method will be discussed below.

Figure 1:
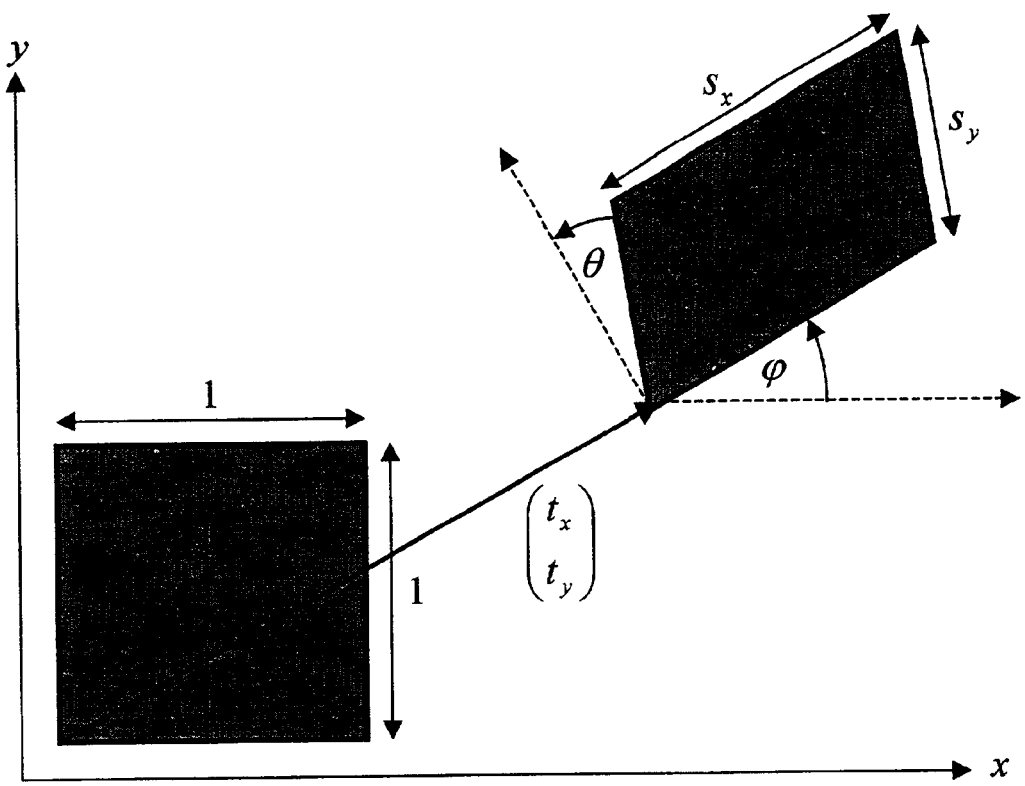
FIG. 1 graphically shows the parameters of a general affine transformation.
Figure 2A:
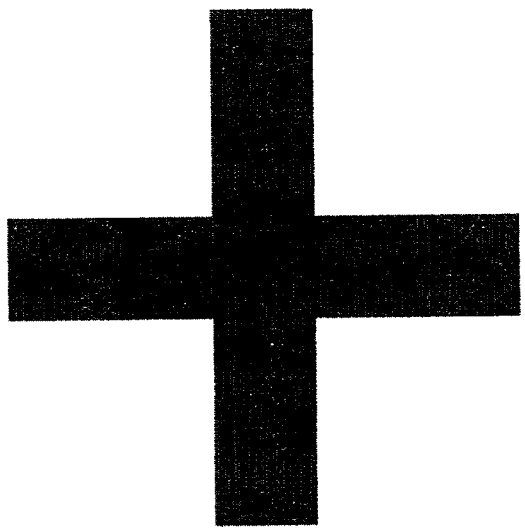
FIG. 2a shows a sample image of an object to be recognized.
Figure 2B:
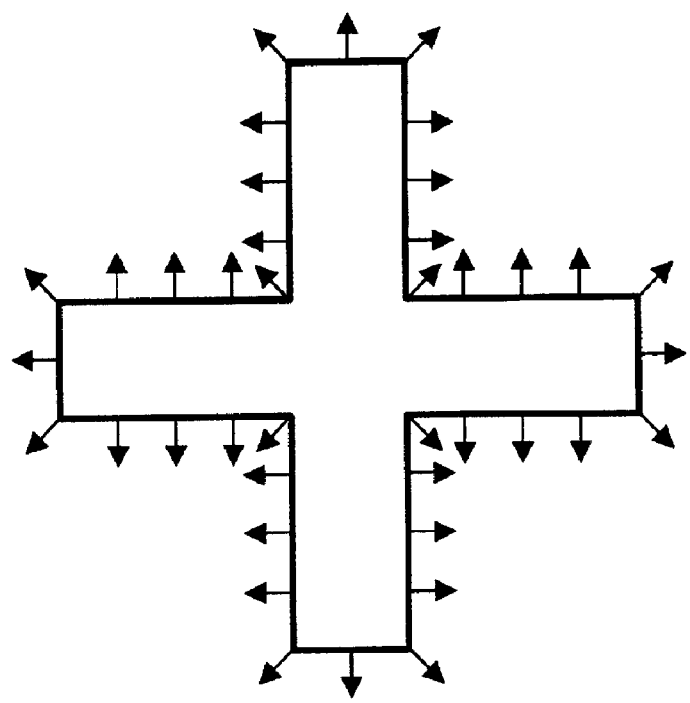
FIG. 2b shows a model of the object being generated by using an edge filter.
Figure 2C:
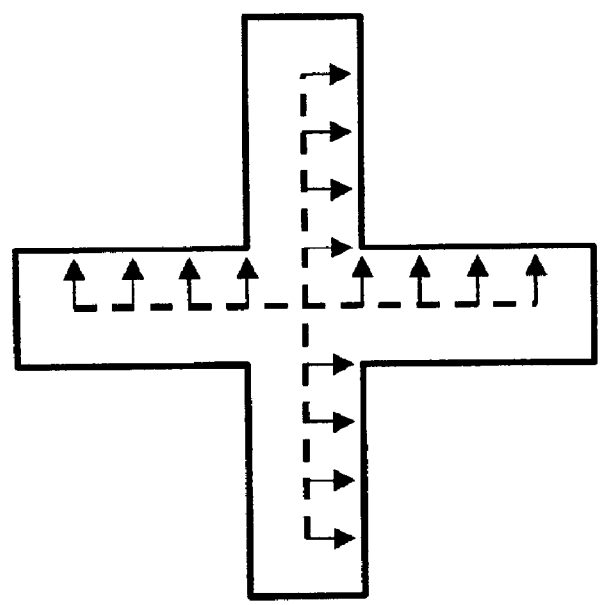
FIG. 2c shows a model of the object being generated using line extraction.

FIG. 2a displays a sample image of an object to be recognized: a dark cross on a bright background. FIG. 2b displays a model of the object, which in this case has been generated by using an edge filter (see the section on model generation below). The points of the model are represented by the tails of the arrows, while their direction is represented by the orientation of the arrows. Another possible representation of the object as a model is shown in FIG. 2c. Here, line extraction has been used to determine the model points, leading to a model that represents the center lines of the cross. Further methods to generate the model, e.g., corner detection, are discussed in the section on model generation below. In all feature extraction methods, the points may be pixel-precise or subpixel-precise.

In light of the foregoing, the model consists of points $p_i = (p_i^x, p_i^y)^T$ and associated direction vectors $d_i = (d_i^x, d_i^y)^T$, $i = 1, \ldots, n$, where n is the number of points in the model. Preferably, the points $p_i$ are coordinates relative to the center of gravity of the ROI or the n points themselves, i.e., the center of gravity is the origin and reference point of the model. Likewise, the image in which the model should be recognized can be transformed into a representation in which a direction vector $e_{x,y} = (e_{x,y}^x, e_{x,y}^y)^T$ is obtained for each image point $(x,y)^T$. In the matching process, a transformed model must be compared to the image at a particular location. In the most general case, the transformation is a perspective transformation. To keep the exposition of the algorithm simple, affine transformations are used throughout the remainder of the discussion. This should not be construed, however, to imply that the algorithm is limited to this class of transformations. It is useful to separate the translation part of the affine transformation from the linear part. Therefore, a linearly transformed model is given by the points $p'_i = A p_i$ and the accordingly transformed direction vectors $d'_i = A d_i$, where $$A = \begin{pmatrix} a_{11} & a_{12} \\ a_{21} & a_{22} \end{pmatrix}.$$

As discussed above, the match metric by which the transformed model is compared to the image content must be robust to occlusions, clutter, and lighting changes. One possible metric which achieves this goal according to one embodiment of the present invention is to sum the (unnormalized) dot product of the direction vectors of the transformed model and the image over all points of the model to compute a matching score at a particular point $(x,y)^T$ of the image, i.e., the match metric of the transformed model at the point $(x,y)^T$, which corresponds to the translation part of the affine transformation, is computed as follows:

$$m = \frac{1}{n} \sum_{i=1}^{n} \langle d'_i, e_{x+p_i'^x, y+p_i'^y} \rangle = \frac{1}{n} \sum_{i=1}^{n} d_i'^x e^x_{x+p_i'^x, y+p_i'^y} + d_i'^y e^y_{x+p_i'^x, y+p_i'^y}.$$

The advantage of this match metric is that neither the model image nor the image in which the model should be recognized need to be segmented (binarized), i.e., it suffices to use a filtering operation that only returns direction vectors instead of an extraction operation which also segments the image. Therefore, if the model is generated by edge or line filtering, and the image is preprocessed in the same manner, this match metric fulfills the requirements of robustness to occlusion and clutter. If parts of the object are missing in the image, there are no lines or edges at the corresponding positions of the model in the image, i.e., the direction vectors $e_{x+p_i'^x, y+p_i'^y}$ will have a small length and hence contribute little to the sum. Likewise, if there are clutter lines or edges in the image, there will either be no point in the model at the clutter position or it will have a small length, which means it will contribute little to the sum. Therefore, the above match metric reflects how well the points in the image and model that correspond to each other align geometrically.

However, with the above match metric, if the image brightness is changed, e.g., by a constant factor, the match metric changes by the same amount. Therefore, it is preferred to modify the match metric. By calculating the sum of the normalized dot product of the direction vectors of the transformed model and the image over all points of the model, i.e.:

$$m = \frac{1}{n} \sum_{i=1}^{n} \frac{\langle d'_i, e_{x+p_i'^x, y+p_i'^y} \rangle}{\|d'_i\| \cdot \|e_{x+p_i'^x, y+p_i'^y}\|} =$$

$$\frac{1}{n} \sum_{i=1}^{n} \frac{d_i'^x e^x_{x+p_i'^x, y+p_i'^y} + d_i'^y e^y_{x+p_i'^x, y+p_i'^y}}{\sqrt{(d_i'^x)^2 + (d_i'^y)^2} \cdot \sqrt{\left(e^x_{x+p_i'^x, y+p_i'^y}\right)^2 + \left(e^y_{x+p_i'^x, y+p_i'^y}\right)^2}}.$$

Because of the normalization of the direction vectors, this match metric is additionally invariant to arbitrary illumination changes. In this preferred embodiment all vectors are scaled to a length of 1, and what makes this metric robust against occlusion and clutter is the fact that if an edge or line is missing, either in the model or in the image, noise will lead to random direction vectors, which, on average, will contribute nothing to the sum.

The above match metric will return a high score if all the direction vectors of the model and the image align, i.e., point in the same direction. If edges are used to generate the model and image vectors, this means that the model and image must have the same contrast direction for each edge. This metric would, for example, be able to recognize only crosses that are darker than the background if the model is generated from a cross that is darker than the background. Sometimes it is desirable to be able to detect the object even if its contrast is reversed. To make the match metric robust against such global changes of contrast, the absolute value of the sum of the normalized dot products can be used according to a further preferred embodiment of the present invention, i.e., the match metric becomes:

$$m = \left| \frac{1}{n} \sum_{i=1}^{n} \frac{\langle d'_i, e_{x+p_i'^x, y+p_i'^y} \rangle}{\|d'_i\| \cdot \|e_{x+p_i'^x, y+p_i'^y}\|} \right|.$$

This match metric means geometrically that all direction vectors in the image (as a whole) must either point in the same direction or in the opposite direction as the direction vectors in the model.

In rare circumstances, it might be necessary to ignore even local contrast changes, e.g., if the objects to be recognized consist of a medium gray body, which can have either a darker or lighter print on it. In this case, according to a further preferred embodiment, the match metric can be modified to be the sum of the absolute values of the normalized dot products:

$$m = \frac{1}{n} \sum_{i=1}^{n} \frac{|\langle d'_i, e_{x+p_i'^x, y+p_i'^y} \rangle|}{\|d'_i\| \cdot \|e_{x+p_i'^x, y+p_i'^y}\|}.$$

Geometrically, this match metric means that each direction vector in the image individually must either point in the same or opposite direction as the corresponding direction vector in the model.

The above three normalized match metrics are robust to occlusion in the sense that the object will be found if it is occluded. As mentioned above, this results from the fact that the missing object points in the instance of the model in the image will on average contribute nothing to the sum. For any particular instance of the model in the image, this may not be true, e.g., because the noise in the image is not uncorrelated. This leads to the undesired fact that the instance of the model will be found in different poses in different images, even if the model does not move in the images, because in a particular image of the model the random direction vectors will contribute slightly different amounts to the sum, and hence the maximum of the match metric will change randomly. To make the localization of the model more precise, it is useful to set the contribution of the missing model points in the image to zero. The easiest way to do this is to set all inverse lengths $1/\|e_{x+p'_i{}^x, y+p'_i{}^y}\|$ of the direction vectors in the image to 0 if their length $\|e_{x+p'_i{}^x, y+p'_i{}^y}\|$ is smaller than a threshold that depends on the noise level in the image and the preprocessing operation that is used to extract the direction vectors in the image. This threshold is specified by the user. By this modification of the match metric it can be ensured that an occluded instance of the model will always be found in the same pose if it does not move in the images.

All three normalized match metrics have the property that they return a number smaller than 1 as the score of a potential match. In all cases, a score of 1 indicates a perfect match between the model and the image. Furthermore, the score roughly corresponds to the portion of the model that is visible in the image. For example if the object is 50% occluded, the score cannot exceed 0.5. This is a highly desirable property because it gives the user the means to select an intuitive threshold for when an object should be considered as recognized.

Since the dot product of the direction vectors is related to the angle the direction vectors enclose by the arc cosine function, other match metrics could be defined that also capture the geometrical meaning of the above match metrics. One such metric is to sum up the absolute values of the angles that the direction vectors in the model and the direction vectors in the image enclose. In this case, the match metric would return values greater or equal to zero, with a value of zero indicating a perfect match. In this case, the pose of the model must be determined from the minimum of the match metric.

Object Recognition Method

To find the object in the image, the a-priori unbounded search space needs to be bounded. This is achieved through the user by setting thresholds for the parameters of the search space. Therefore, in case of affine transformations the user specifies thresholds for the two scaling factors, the skew angle, and the rotation angle:

$S_{x,min} \leq S_x \leq S_{x,max}$ $S_{y,min} \leq S_y \leq S_{y,max}$ $\theta_{min} \leq \theta \leq \theta_{max}$ $\phi_{min} \leq \phi \leq \phi_{max}$ The bounds for the translation parameters could also be specified by two thresholds each, but this would limit the space of translations to rectangles. Therefore, according to the method of the invention the bounds for the translation parameters are more conveniently specified as an arbitrary region of interest in the image in which the model should be recognized.

The simplest form of matching is to discretize the bounded search space, e.g., as described below, to transform the model by all combinations of transformation parameters thus obtained, and to compute the match metric for all resulting transformed models. This results in a score for all possible parameter combinations. After this, all valid object instances can be selected by requiring that the score at the respective set of parameters is above a minimum threshold selected by the user, i.e., $m \geq m_{min}$, and that the score is a local maximum of the match metric in the transformation space.

If the object to be recognized possesses symmetries, e.g., the rotation and reflection symmetry of the cross in FIG. 2a, several instances of the object will be found, which differ, e.g., in their rotation and scaling parameters, but have very close translation parameters, i.e., the recognized objects will overlap. In most cases, it is desirable to remove all overlapping instances except the instance with the best score. To do so, the mutual overlap of the found instances is computed by comparing the area of the intersection of the smallest enclosing rectangle of arbitrary orientation of the found instances of the model with the smaller of the two enclosing rectangles. If the overlap is more than a user-selectable fraction, the instance with the smaller score is discarded.

In the usual mode of operation, all instances that fulfill the score and overlap criterion are returned by the method of the invention. Sometimes it is known a-priori how many instances of the model need to be found in the image. Therefore, the user may specify the number o of instances of the model to be found in the image. In this case, only the o best instances after the removal of overlapping instances are returned.

Discretization of the Search Space

All of the match metrics disclosed in this invention require a large overlap of the transformed model and the object in the image for the correct score to be computed. The degree of overlap is influenced by the preprocessing steps taken to obtain the direction information. If line or edge filtering methods are used to obtain the direction information, the degree of overlap of the model and the instance in the image directly depends on the degree of smoothing that was used in the line or edge filter. If a filter with little smoothing is used, e.g., a Sobel edge filter, all points of the transformed model must lie within approximately one pixel of the instance in the image (depending on how blurred the edges of the object appear in the image by the optics of the camera) so that the correct score is obtained. If the image is smoothed before the edge or line extraction is performed, this distance becomes larger in proportion to the amount of smoothing that is applied because the edges or lines are broadened by the smoothing operation. For example, if a mean filter of size k×k is applied before or in the feature extraction (e.g., line or edge filtering), the model points must lie within k pixels of the instance. Similar results hold for other smoothing filters, e.g., the Gaussian filter used in the Canny edge extractor and the Steger line detector.

Figure 3:
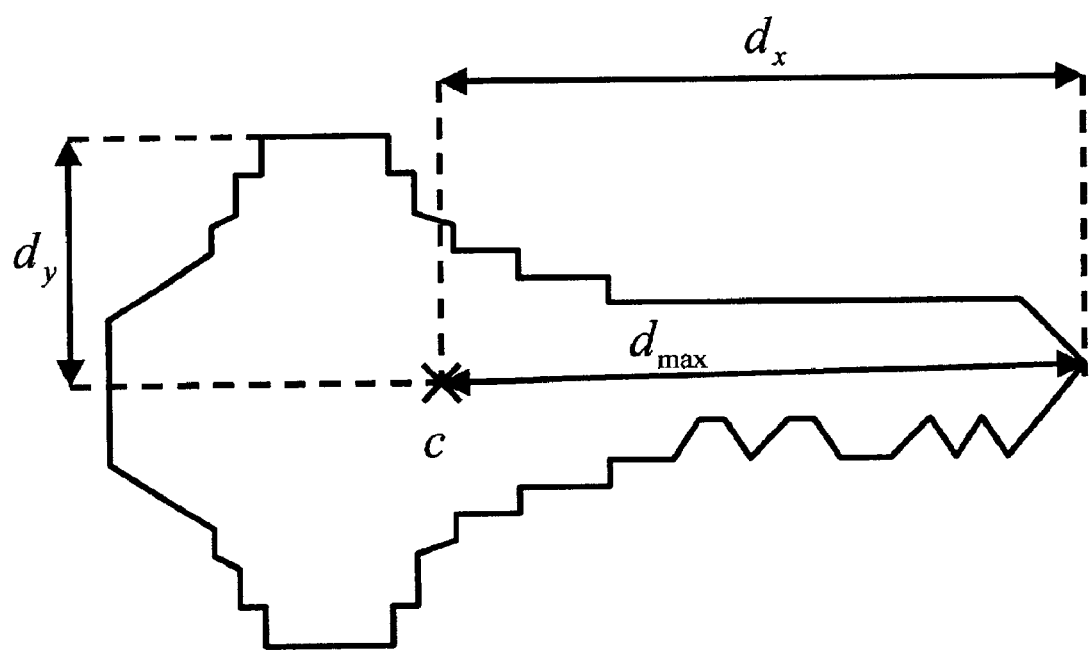
FIG. 3 shows a sample model of a key along with the parameters that are used to derive the discretization length.

The transformation space needs to be discretized in a manner that the above requirement of all model points lying at most k pixels from the instance in the image can be ensured. FIG. 3 shows a sample model of a key along with the parameters that are used to derive the discretization step lengths. The point c is the reference point of the model, e.g., its center of gravity. The distance $d_{max}$ is the largest distance of all model points from the reference point. The distance $d_x$ is the largest distance of all model points from the reference point measured in the x direction only, i.e., only the x coordinates of the model points are used to measure the distances. Likewise, the distance $d_y$ is largest distance of all model points from the reference point measured in the y direction only. To ensure that all model points created by scaling the model in the x direction lie within k pixels from the instance in the image, the step length $\Delta s_x$ must be chosen as $\Delta s_x=k/d_x$. Likewise, $\Delta s_y$ must be chosen as $\Delta s_y=k/d_y$. The discretization of the skew angle only depends on the distance $d_y$, since the x axis remains fixed in a skew operation. Hence the step length of the skew angle $\Delta\theta$ must be chosen as $\Delta\theta=\arccos(1-k^2/(2d_y^2))$. Similarly, the step length of the rotation angle must be chosen as $\Delta\phi=\arccos(1-k^2/(2d_{max}^2))$. Finally, the step lengths in the translation parameters must both be equal to k, i.e., $\Delta t_x=\Delta t_y=k$.

Speed-Up of the Recognition Method

The exhaustive search algorithm described above will find the object in the image if it is present, but the runtime of the method will be fairly high. Various methods are used according to preferred embodiments of the present invention to speed up the recognition process.

First, the sum of the dot products is preferably not computed completely, since the score must be above the minimum score $m_{min}$ so that a potential instance is obtained. Let $m_j$ denote the partial sum of the dot products until the j-th element of the model. For the match metric that uses the sum of the normalized dot products, this is:

$$m_j = \frac{1}{n}\sum_{i=1}^{j} \frac{\langle d_i', e_{x+p_i'^x,y+p_i'^y}\rangle}{\|d_i'\|\cdot\|e_{x+p_i'^x,y+p_i'^y}\|}.$$

Obviously, all the remaining n−j terms of the sum are all smaller or equal than one. Therefore, the partial score $m_j$ can never achieve the required score $m_{min}$ if $m_j<m_{min}-1+j/n$, and hence the evaluation of the sum can be discontinued after the j-th element whenever this condition is fulfilled. This criterion speeds up the recognition process considerably. Nevertheless, further speed-ups are highly desirable. Another criterion is to require that all partial sums have a score better than $m_{min}$, i.e., $m_j \geq m_{min}$. When this criterion is used, the search will be very fast, but it can no longer be ensured that the method finds the correct instances of the model because if missing parts of the model are checked first, the partial score will be below the required score. To speed up the recognition process with a very low probability of not finding the object although it is visible in the image, the following heuristic can be used: the first part of the model points is examined with a relatively safe stopping criterion, while the remaining part of the model points are examined with the hard threshold $m_{min}$. The user can specify what fraction of the model points is examined with the hard threshold with a parameter g. If g=1, all points are examined with the hard threshold, while for g=0, all points are examined with the safe stopping criterion. With this, the evaluation of the partial sums is stopped whenever $m_j<\min(m_{min}-1+fj/n,m_{min})$, where $f=(1-gm_{min})/(1-m_{min})$. Typically, the parameter g can be set to values as high as 0.9 without missing an instance in the image. Obviously, other stopping criteria in the same spirit as the above criterion can be defined.

Second, the normalization of the gradient lengths for the model points is obviously best done at the time the model is created, i.e., the model points are stored with direction vectors of length 1. The inverse gradient lengths $1/\|e_{x+p_i'^x,y+p_i'^y}\|$ of the image points can be calculated in advance if the range of values that the components of the direction vector can take is limited. In this case, they are only calculated once and stored in a matrix that is indexed by the two components of the direction vector. For example, if signed one-byte values are used to encode the direction vectors, the matrix will be of size 256×256. Storing the inverse lengths of the direction vectors has the additional advantage that the division is replaced by a multiplication, which is much faster on almost all micro processors. A final advantage of storing the inverse lengths is that the discarding of contributions of missing object points described above can simply be done by setting all inverse direction vector lengths below a certain length to 0 in the table.

Another large speed-up is obtained by searching the space of allowable transformations using a recursive coarse-to-fine strategy. The object recognition method described above corresponds to a search in a search space with the finest possible discretization where the step lengths are set to the values that are obtained for k=1. This results in a relatively slow exhaustive search. To speed up the search, the exhaustive search can be carried out in a search space where the step lengths are multiples of the step length at the finest level. The matches found in this coarsely discretized search space must then be tracked through progressively more finely discretized search spaces until the match is found in the finest level of discretization. In all levels of discretization, the note on smoothing in the section on the discretization of the search space must be observed, i.e., temporary images for each level of discretization must be created where each image must be smoothed by an amount that corresponds to the step length of the corresponding discretization level in order to ensure that the object is always found. A good choice for the step length parameters for the different discretization levels is to set them to the values that are obtained if $k=2^l$, where $l=0,\ldots,l_{max}$. The number of discretization levels ($l_{max}+1$) should be chosen by the user so that the object is still discernible under the smoothing necessary for the corresponding value of $k=2^{l_{max}}$. As an example, if the search space is the space of rigid transformations, if the model has a maximum of $d_{max}=100$, and if $l_{max}=3$ is chosen by the user, the following step lengths are obtained for the different discretization levels of the search space according to the method discussed in the section "Discretization of the Search Space":

| l | $\Delta t_x$ | $\Delta t_y$ | $\Delta\omega$ |
|---|---|---|---|
| 0 | 1 | 1 | 0.573 |
| 1 | 2 | 2 | 1.146 |
| 2 | 4 | 4 | 2.292 |
| 3 | 8 | 8 | 4.585 |

For a further speed-up, the number of points in the model is preferably also reduced by a factor $k=2^l$ for the different discretization levels of the search space (see the section on model generation below). The necessary smoothing is preferably obtained by using a mean filter, because it can be implemented recursively, and hence the runtime to smooth the image does not depend on the smoothing parameter. Alternatively, a recursive implementation of the Gaussian smoothing filter can be used. Although this discretization and smoothing method already yields acceptable runtimes, a further speed up can be obtained by also subsampling the image by a factor identical to the translation step lengths $\Delta t_x$ and $\Delta t_y$ on each discretization level. In this case, the step lengths for the translation parameters will, of course, have to be set to 1 in each level. Now, however, care must be taken to propagate the correct translation parameters through the levels of discretization. If, as described above, the translation step lengths double in each level of the discretization space, the translation parameters of the found objects must be doubled before searching the next finer discretization level. Obviously, the subsampling of the image does not affect the other four parameters of the affine transformation.

If the mean filter is used, this subsampling and smoothing process corresponds to a mean image pyramid (Tanimoto (1981)). If the Gaussian filter is used for smoothing, a Gaussian image pyramid is obtained.

If the space of transformations is the space of translations or the space of rigid transformations the method described above will already have close to optimal runtime. If the space of transformations is larger, e.g., the space of similarity or affine transformations, it may be possible to speed up the search by using methods such as the generalized Hough transform (Ballard (1981)) or the method described in Rucklidge (1997), which potentially rules out large parts of the transformation space quickly, to identify potential matches more quickly in the coarsest level of the discretization space. Because the potential of false matches is higher with these methods, it is essential to use the method disclosed here to verify and track the potential matches through the levels of the discretization space. Furthermore, because the accuracy of the potential matches will be poor, the pose returned by the preprocessing steps must be enlarged to a region in the transformation space by a sufficient amount to ensure that the true match based on the method disclosed here will be found.

Figure 4:
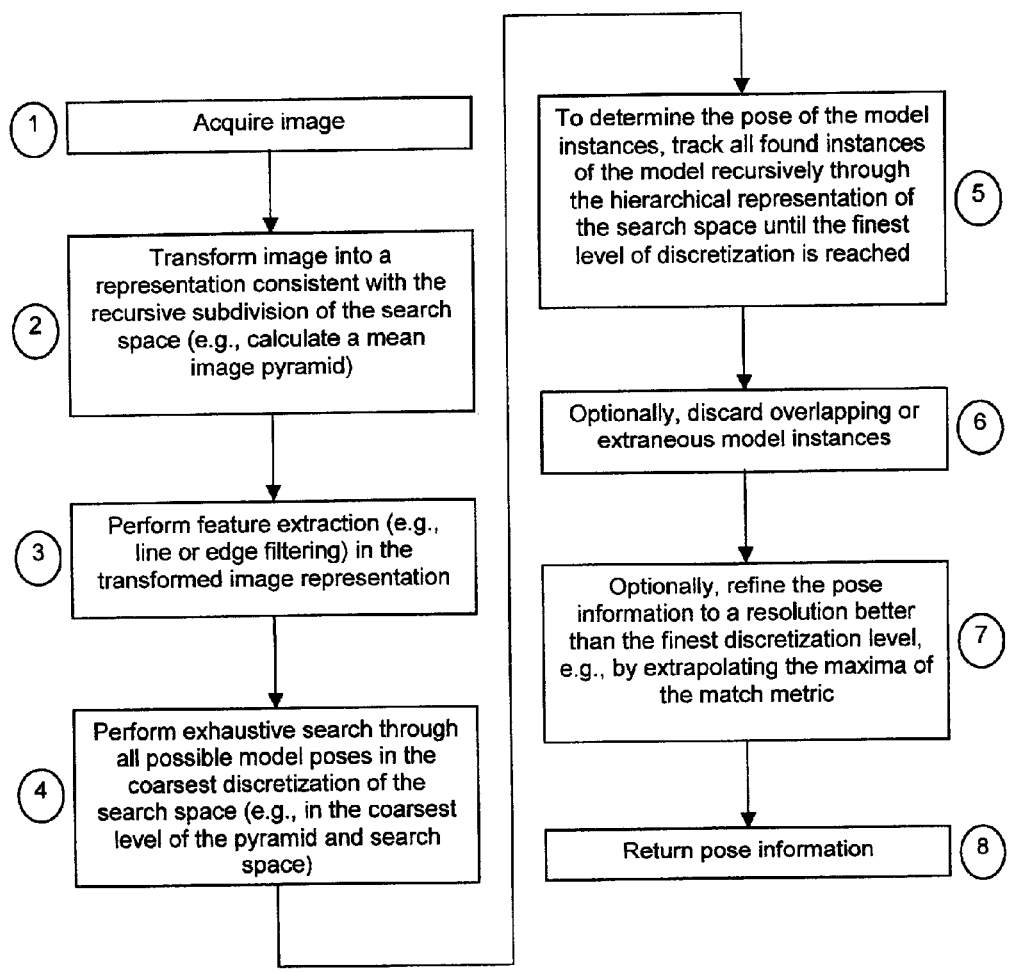
FIG. 4 shows a preferred embodiment of a recursive object recognition method according to the present invention.

With these explications, the preferred object recognition method can be seen in FIG. 4. In the first step (1), an image in which the model should be found is acquired from an external device, e.g., a camera or a scanner.

Then, the image is transformed into a representation that is consistent with the recursive subdivision of the search space (step 2). In the preferred embodiment the user selects the coarsest subdivision of the search space by specifying the parameter $l_{max}$. Then, $l_{max}$ temporary images are created in addition to the original image. Preferably, these $l_{max}+1$ images are then preprocessed to build up a mean image pyramid of the original image, which means that the image in each level l of the pyramid has half the side lengths of the image in the next lower pyramid level and in which the gray levels are obtained by averaging a 2×2 block of gray values in the appropriate position of the next lower level of the pyramid. Alternatively, the temporary images are created by omitting the subsampling step and using a mean filter with the appropriate mask size for each discretization level on the original image.

After this step, feature extraction is performed in each of the $l_{max}+1$ images (step 3) The feature extraction can, for example, be done by applying an edge or line filter to the images to obtain the direction vectors in the image. If such filter operations are used, no segmentation (binarization) operation is performed. If image pyramids are used, the direction vectors could also be obtained from any region segmentation procedure, e.g., thresholding the image, where the threshold is derived from the image, e.g., by histogram analysis, followed by computing the normal to the boundary of the segmented region, e.g., by computing a least squares line fit of a certain number of boundary points around a particular boundary point and using the normal of the line as the direction of that boundary point.

Hereupon, an exhaustive search through the coarsest level $l_{max}$ of the discretization space is performed (step 4). This means that for all combinations of parameter values, the match metric of the model transformed with the corresponding parameter values is computed by one of the match metrics described above. As described below in the section on model generation, the transformed models may be precomputed at the time the model is generated. If this was not done, the model must be transformed in this step by applying the affine transformation parameters to the points of the model and the linear transformation parameters to the direction vectors of the model. This results in a score for each possible combination of parameter values. The scores are then compared with the user-selected threshold $m_{min}$. All scores exceeding this threshold are combined into regions in the search space. In these regions, local maxima of the match metric are computed by comparing the scores of a certain set of parameters with scores of neighboring transformation parameters. The resulting local maxima correspond to the found instances of the model in the coarsest discretization of the search space. These found instances are inserted into a list of instances, which is sorted by the score of the instance.

Once the exhaustive match on the coarsest discretization level is complete, the found instances are tracked through the finer levels of the discretization space until they are found at the lowest level of the discretization space (step 5). The tracking is performed as follows: The first unprocessed model instance is removed from the list of model instances. This is the unprocessed instance with the best score, since the list of instances is sorted by the score. The pose parameters of this instance are then used to define a search space in the next lower level of the discretization. Ideally, the model would be located at the position given by the appropriate transformation of the pose parameters, i.e., the scaling parameters $s_x$ and $s_y$ as well as the angles $\phi$ and $\theta$ are rounded to the closest parameter in the next finer level of the discretization, while the translation parameters are either scaled by a factor of 2, if image pyramids are used, or passed unmodified, if subsampling is not used. However, since the instance has been found in a coarse discretization level in which the image has been smoothed by twice the amount than in the next finer level, there is an uncertainty in the pose parameters that must be taken into account when forming the search space in the next lower level of the discretization. A good choice for the search space is obtained by constructing a rectangle of size 5×5 around the propagated translation parameters. Furthermore, the search space for the other four parameters is constructed by including the next lower and higher values of the parameters in the finer level into the search space. As an example, suppose the space of transformations consists of the rigid transformations, that image pyramids have been used, and the instance has been found in level l=3 of the discretization with the following pose: $(t_x,t_y)=(34,27)$, $\phi=55.020°$. Then the search space in the finer level l=2 is given by: $66 \leq t_x \leq 70$, $52 \leq t_y \leq 56$, and $52.716° \leq \phi \leq 57.300°$ (the table with the discretization step lengths in the example above should be kept in mind). The model is then searched with all transformations in the search space in the finer level by computing the match metric in the same manner as described above for the exhaustive match on the coarsest level of discretization. The maximum score within the search space is identified. If the corresponding pose lies at the border of the search space, the search space is iteratively enlarged at that border until the pose with the maximum score lies completely within the search space, i.e., not at the borders of the search space. If the maximum score thus obtained exceeds the user-selected threshold $m_{min}$, the instance is added to the list of found instances in the appropriate place according to its score.

On the finest level of the discretization space, found instances are checked if they overlap too much with other instances at the time the instance is inserted into the list (step 6). As described above, the overlap between the instances is calculated as the ratio of the area of the intersection of the smallest enclosing rectangle of arbitrary orientation around each pair of instances and the smaller of the two rectangles. If the overlap is larger than a user-supplied fraction, only the instance with the better score is kept in the list. If the user has not specified a maximum number of instances to find, the recursive tracking of the model stops if all found instances are on the finest level of the discretization. If the user has specified a maximum number o of instances to find, the recursive tracking of the model stops if the number of instances found on the finest discretization level is less than o and if all found instances are in the finest level of the discretization, i.e., if there are fewer instances in the image than the number specified by the user. Alternatively, the search stops if o instances have been found in the finest level of the discretization. The tracking method then checks all unprocessed instances in coarser levels of discretization to see if their score is close enough to the score of the worst found instance on the finest level because these instances might lead to better scores in the finer levels of discretization than the best o instances found so far. If an unprocessed instance has a score better than a constant, e.g., 0.9, times the worst score found on the finest level, this instance is also tracked recursively through the search space in the above manner to ensure that the best o matches are found. This means that all extraneous instances, i.e., all instances found over the limit o, are removed in this step 6.

If the user has specified that the pose should be returned with a better resolution than the finest discretization level, the maximum of the match metric corresponding to each found instance is extrapolated with subpixel resolution (step 7). This can, for example, be done by calculating the first and second derivatives of the match metric with respect to the parameters of the chosen space of transformations. The first and second derivatives can be obtained, for example, from scores neighboring the maximum score by convolution with the appropriate first and second derivative masks, e.g., n-dimensional facet model masks (see Steger (1998) [Carsten Steger. An unbiased detector of curvilinear structures. *IEEE Transactions on Pattern Analysis and Machine Intelligence*, 20(2):113–125, February 1998] for 2-dimensional versions of these masks; they generalize to n dimensions in a straightforward manner). This leads to a Taylor polynomial in the maximum score cell of the discrete search space, from which the maximum can be computed easily by solving a set of linear equations.

While the extraction of the pose with a better resolution than the finest discretization level using the extrapolation of the maximum of the match metric already results in poses, which are accurate enough for almost all applications (typically better than 1/20 pixel in position and 1/10° in rotation, for example), in rare cases it might be desirable to extract the pose with an even greater accuracy. This can be done by a least-squares fit of the points in the model to the points of the found instance of the model in the image. Note that this requires extracting points from the image, which was not necessary so far. This point will be discussed below. Traditionally, the least-squares fit would be performed by finding for each model point the corresponding point in the image and minimizing the average distance between the model points and the image points. Of course, not every point in the model needs to have a corresponding point in the image, e.g., because of occlusion. Therefore, the correspondence results in a subset $q_j$, j=1, ..., m, of the model points $p_i$ which corresponds to a set of image points $r_j$. The least-squares fit would traditionally compute the pose by minimizing the distance between the transformed model points and the corresponding image points, i.e., $$\frac{1}{m}\sum_{j=1}^{m} \|Aq_j + t - r_j\|_2 \to \min$$

With this approach, the model and image points must be extracted with subpixel precision. If they are only extracted with pixel precision, the model points on average cannot be moved closer to the image points than approximately 0.25 pixels because of the discrete nature of the model and image points, and hence no improvement in the accuracy of the pose would result. However, even if the model and image points are extracted with subpixel precision the model and the image cannot be registered perfectly because usually the image and model points will be offset laterally, which typically results in a nonzero average distance even if the model and the found instance would align perfectly. Furthermore, the traditional least-squares approach neglects the direction information inherent in the model and the image. These shortcomings can be overcome by minimizing the distance of the image points from the line through the corresponding model point that is perpendicular to the direction stored in the model. For edges and lines, this line is parallel to the model edge or line. The line through the model point in the direction perpendicular to the model direction vector is given by $d_j^T(p-p_j)=d_j^x(x-p_j^x)+d_j^y(y-p_j^y)=0$. Therefore the following distance would need to be minimized:

$$\frac{1}{m}\sum_{j=1}^{m} (Ad_j^T(r_j - (Aq_j + t)))^2 =$$

$$\frac{1}{m}\sum_{j=1}^{m} (d_j'^x(r_j^x - q_j'^x - t_x) + d_j'^y(r_j^y - q_j'^y - t_y))^2 \to \min$$

An approach of this type for determining a rigid transformation is described in Wallack and Maocha (1998) [Aaron Wallack and Dinesh Manocha. Robust Algorithms for Object Localization. *International Journal of Computer Vision*, 27(3):243–262, 1998]. This approach assumes that the correspondence problem has already been solved. Furthermore, the model features are line segments and circular arcs instead of points and direction vectors. However, this approach is computationally inefficient because both the model points and their direction vectors need to be transformed. Approximately half of the operations can be saved if instead the transformation from the image points to the model points is computed in the least-squares fit, i.e., $$\frac{1}{m}\sum_{j=1}^{m} (d_j^T(A'r_j + t' - q_j))^2 \to \min$$

The desired pose parameters A and t are related to the thus computed pose parameters A' and t' by inverting the corresponding map, i.e., $A=A'^{-1}$ and $t=-A'^{-1}t'$. The above least-squares problem may be nonlinear, e.g., if only the translation and rotation need to be determined. It can be solved by methods similar to those described in Press et al. (1992) [William H. Press, Saul A. Teukolsky, William T. Vetterling, and Brian P. Flannery. Numerical Recipes in C: The Art of Scientific Computing; 2nd Edition. Cambridge University Press, 1992], chapter 15.5. In contrast to the methods described in Press et al. (1992), here usually only one iteration of the minimization procedure is needed because very good starting values for the optimization are available from the subpixel extrapolation of the match metric described above. As mentioned above, the model and image points need to be extracted with subpixel precision. This can be achieved with well-known methods, e.g., as described in Steger (2000) [Carsten Steger. Subpixel-Precise Extraction of Lines and Edges. *International Archives of Photogrammetry and Remote Sensing,* volume XXXIII, part B3, pages 141–156, 2000] for lines and edges or in Förstner (1994) [Wolfgang Förstner. A framework for low level feature extraction. In Jan-Olof Eklundh, editor, *Third European Conference on Computer Vision,* volume 801 of *Lecture Notes in Computer Science,* pages 383–394, Berlin, 1994. Springer-Verlag] for corners. All these methods would require a threshold for the feature extraction. This threshold would make the method sensitive to contrast changes. The image points' location, however only depends on a particular measure, e.g., the gradient magnitude, being a local maximum (sometimes only in a particular direction, e.g., the gradient direction). Therefore, in the preferred embodiment of the invention, the thresholding step is omitted and the image points are solely extracted based on these local maxima. For the case of edges, for example, the image points are extracted by finding the points where the gradient magnitude is a local maximum in the direction of the gradient without imposing any constraints on the gradient magnitude. Of course, the feature extraction is only performed in a region of interest that corresponds to the model transformed with the pose that was found with the subpixel extrapolation of the maximum of the match metric, enlarged by a suitable amount, e.g., dilated by a 5×5 rectangular mask. The final problem that needs to be solved is the correspondence between the model points and the image points. Since no thresholding is involved in the feature extraction, and since there may be occlusions and clutter in the image, the correspondence algorithm must be robust to outliers. In the preferred embodiment of the invention, the model points and direction vectors are transformed with the pose obtained by the subpixel extrapolation from the match metric. Since these transformed model points already will be very close to the image points, for each transformed model point the corresponding pixel in the image is checked whether it contains a feature point. If so, a correspondence has been found. If not, the two closest pixels in the direction of the transformed model direction vector and the direction of the transformed model direction vector +180° are checked for feature points. If there is one feature point it is used as the corresponding point. If there are feature points in each both pixels, the closest one (as measured by the distance from the feature point to the line defined by the model point and its direction, as described above) is taken as the corresponding point. If there is no correspondence after checking these three points, four additional points corresponding to the direction vector ±45° and ±135° are checked and the closest feature point, if any, is taken as the corresponding point. To make the correspondences robust against outliers, the median absolute distance between the model points and the image points is computed. This results in a robust estimate of the standard deviation of the distances. All correspondences that have a distance greater than a certain factor (e.g., 2) times the robust standard deviation are rejected as outliers. The remaining robust correspondences serve as input to the least-squares fit. Since the feature extraction, correspondence finding, and least-squares fit require some processing time, this refinement of the pose is only executed if the user specifies it.

Finally, the extracted poses of the found instances are returned to the user (step 8).

Model Generation

The model must be generated in accordance with the matching strategy discussed above. At the heart of the model generation is the feature extraction that computes the points of the model and the corresponding direction vector. This can be done by a number of different image processing algorithms. In one preferred embodiment of the invention, the direction vector is the gradient vector of the model image, which can be obtained from standard edge filters, e.g., the Sobel, Canny (see Canny (1986) [John Canny. A computational approach to edge detection. *IEEE Transactions on Pattern Analysis and Machine Intelligence,* 8(6) :679–698, June 1986]), or Deriche (see Deriche (1987) [Rachid Deriche. Using Canny's criteria to derive a recursively implemented optimal edge detector. *International Journal of Computer Vision,* 1:167–187, 1987]) filters. If the image is not segmented, all points in the ROI will be added to the model. Since the direction information is most accurate and reliable in the areas in which the gradient magnitude is large and since the number of points in the ROI is usually very large (and consequently the search will be slow), the number of points in the model image are reduced by using standard segmentation algorithms of the gradient image, e.g., thresholding the gradient magnitude or using a combination of hysteresis thresholding, non-maximum suppression, and computing the skeleton (Canny (1986)). In another preferred embodiment of the invention, the direction vectors can be obtained from a line detection algorithm, e.g., the eigenvector corresponding to the eigenvalue of largest magnitude of the Hessian matrix (the matrix consisting of the second partial derivatives) of the image (see Steger (1998) or Busch (1994) [Andreas Busch. Fast recognition of lines in digital images without user-supplied parameters. In *International Archives of Photogrammetry and Remote Sensing,* volume XXX, part 3/1, pages 91–97, 1994]). Note that the two cited algorithms already segment the image, i.e., return one pixel wide lines, similar to the non-maximum suppression and skeleton operation used in edge detection. In another preferred embodiment of the invention, the direction information can be obtained from a corner detector, e.g., the method of Förstner (1994). This method has the advantage that very few points will be generated for the model. In another preferred embodiment of the invention, the direction information can be obtained from any region segmentation procedure, e.g., thresholding the image, followed by computing the normal to the boundary of the segmented region, e.g., by computing a least squares line fit of a certain number of boundary points around a particular boundary point and using the normal of the line as the direction of that boundary point. As noted in the section that describes the object recognition above, if the least-squares fit is used to refine the pose to a resolution better than the discretizaion of the search space, the model points must be extracted with subpixel precision.

Figure 5:
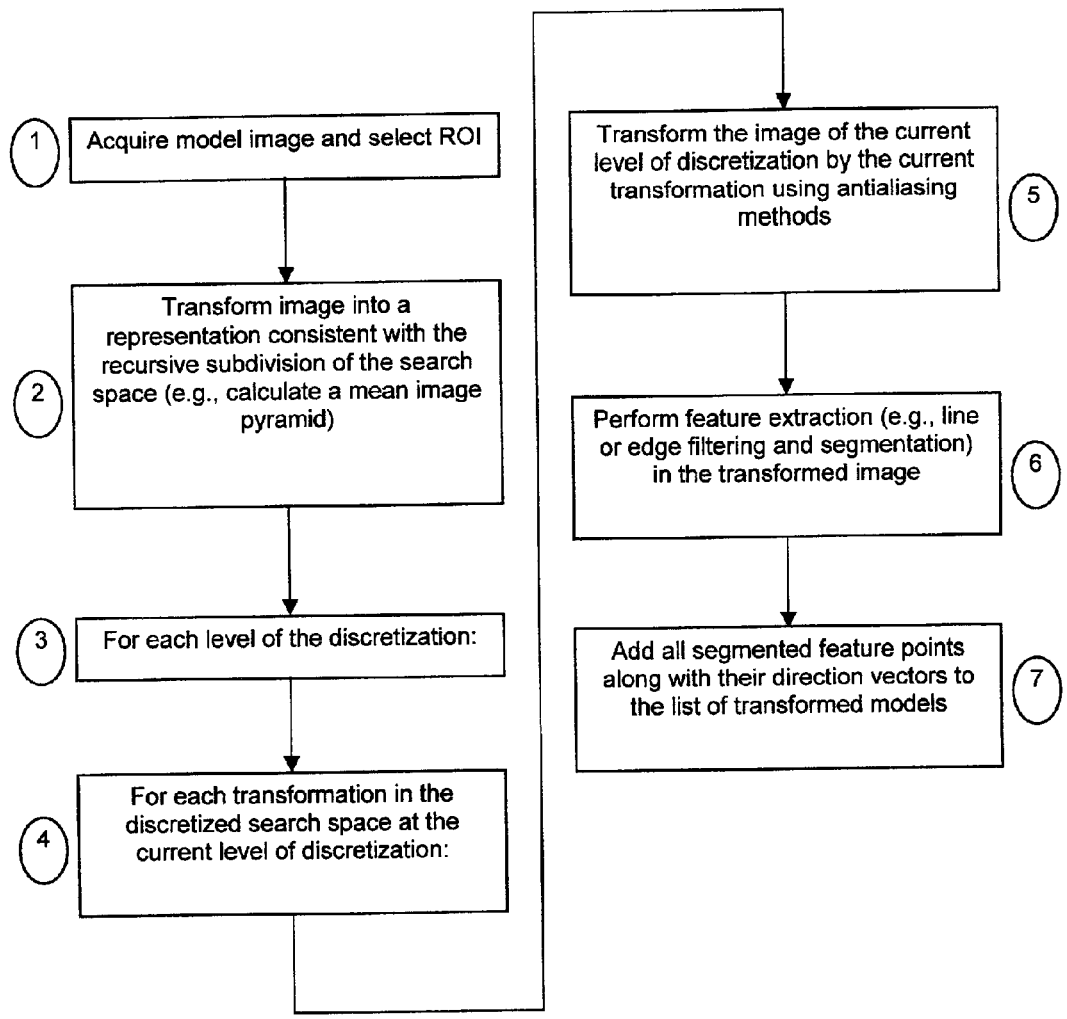
FIG. 5 shows a preferred embodiment of the model generation method according to the present invention.
Figure 6:
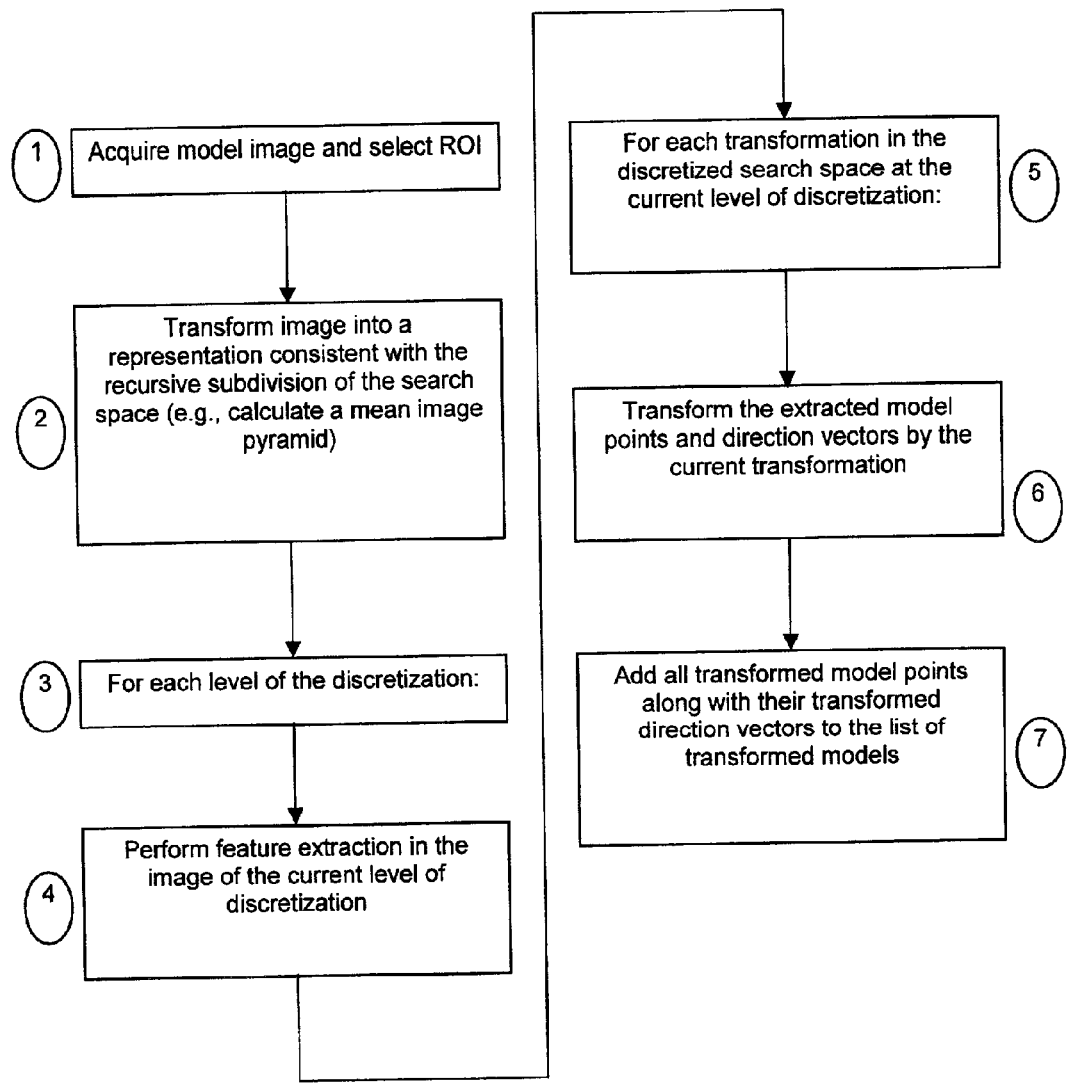
FIG. 6 shows another preferred embodiment of the model generation method according to the present invention.

The complete model generation method is displayed in FIG. 5. First, the image containing the object to be used as the model is acquired from an external device, e.g., a camera or a scanner (step 1). This step includes the selection of a region of interest in which the model lies in the image. The ROI can be specified interactively by the user. Alternatively, the ROI can be generated by an image processing program automatically, e.g., by segmenting the object by an appropriate method, e.g., a threshold operation, and using morphological operations to enlarge the segmented region to ensure that the feature extraction will find all relevant object points within the ROI.

Then (step 2), the image is transformed into a representation that is consistent with the recursive subdivision of the search space. In the preferred embodiment the user selects the coarsest subdivision of the search space by specifying the parameter $l_{max}$. Then, $l_{max}$ temporary images are created in addition to the original image. Preferably, these $l_{max}+1$ images are then preprocessed to build up a mean image pyramid of the original image. Alternatively, the temporary images are created by omitting the subsampling step and using a mean filter with the appropriate mask size for each discretization level on the original image.

After this, for each level of discretization, appropriate models are generated (step 3), i.e., the steps (4)–(7) of FIG. 5 are performed for each level of discretization. The reason to generate models for each level of discretization is to reduce the amount of data in accordance with the step lengths of the translation parameters in each level of the search space. If an image pyramid has been used in step (2) to transform the image, this reduction of the number of points in the model happens automatically. If the subsampling was not performed, the number of data points is reduced after the feature extraction in step (6) below.

For each level of discretization, the search space is sampled according to the discussion of the object recognition method above, using user-specified bounds on the linear transformation parameters:

$S_{x,min} \leq S_x \leq S_{x,max}$ $S_{y,min} \leq S_y \leq S_{y,max}$ $\theta_{min} \leq \theta \leq \theta_{max}$ $\phi_{min} \leq \phi \leq \phi_{max}$ The translation parameters are not sampled, i.e., fixed translation parameters $t_x = t_y = 0$ are used, because the translation parameters do not change the shape of the model. The steps (5)–(7) are performed for each set of parameters from the sampled search space for the current level of discretization. The reason for sampling the search space is to precompute all possible shapes of the model under the allowable transformations and to store the in memory, leading to a significant reduction of runtime in the object recognition phase.

In step (5), the transformed image of the current level of discretization, i.e., the image at the current level of the pyramid or the appropriately smoothed image, which was generated in step (2), is transformed with the current transformation parameters. Here, care must be taken that the object still lies completely within the image after the image transformation. If necessary, a translation is added to the transformation to achieve this, which is accounted for when the extracted model points are added to the model in step (7). The image must be transformed using suitable antialiasing methods, e.g., using bilinear interpolation.

After the image has been transformed, the chosen feature extraction algorithm is applied to the transformed image (6). As discussed above, the feature extraction algorithm can, for example, be line, edge, or corner detection, or a region-based segmentation approach. This results in a list of feature points and their corresponding direction vectors. If subsampling was not used to generate the image at the current level of discretization, the model points are subsampled now. This can, for example, be done by selecting every k-th point of the model (where k the step length of the translation parameters in the current level of discretization). Alternatively, the model points can be grouped into the points that fall into each square of side length k, corresponding to the step lengths of the translation parameters at the current level of discretization, i.e., the extracted feature points are tessellated. Then, the model point closest to the center of each tessellated square that possesses at least one model point is selected as the model point representative of that square. Optionally, the number of model points can be further reduced in this step to speed up the object recognition process later on. This is mainly useful for feature extractors that return chains of feature pixels, e.g., line, edge, and region boundary segmentation procedures. One such method is, for example, to link the extracted pixels into chains of connected pixels (if necessary taking into account the tesselation of the feature points if subsampling was not used in step (2)), resulting in connected contours of the object. Then, the contours can be approximated by polygons, which reduces the amount of data considerably. The model points are in this case the polygon control points. Alternatively, the contours of the object can be subsampled to generate a model with fewer model points, i.e., only every k-th point of the contour is added to the model.

Finally, the model points obtained in step (6) are added to the collection of models at the current discretization level, along with the transformation parameters that were used to generate the transformed model. To make the matching more robust if a greedy search strategy is used, it is useful to add the points to the model in an order in which the first few points of the model are distributed well across the model. This is necessary in the greedy strategy because if all points in the first part of the model happen to be occluded, while all other points would be present, the matching strategy may not find the instance of the model. The simplest way to achieve an even distribution of the first model points is to add the model points to the model in a randomized order.

The model generation strategy described above may generate a very large number of precomputed models of the search space of allowable transformations is large. This leads to the fact that the memory required to store the precomputed models will be very large, which either means that the model cannot be stored in memory or must be paged to disk on systems that support virtual memory. In the second case, the object recognition will be slowed down because the parts of the model that are needed in the recognition phase must be paged back into the main memory from disk. Therefore, if the memory required to store the precomputed models becomes too large, an alternative model generation strategy is to omit step (4) of the method above, and instead to compute only one precomputed model of the object at each level of discretization, corresponding to transformation parameters that leave the object unchanged, i.e., $s_x = s_y = 1$ and $\phi = \theta = 0°$. In this case, the transformation of the model must be done on the fly when the model is matched to the image, as described above for the object recognition method.

The model generation strategy above transforms the image with each allowable transformation of the set of transformations in each discretization level because it tries to take into account possible anisotropic results of the feature extractor, i.e., the fact that the direction vectors the feature extractor returns may depend in a biased manner on the orientation of the feature of the image. If it is known that the feature extractor is isotropic, i.e., that the direction vectors that the feature extractor returns are correct, no matter in which orientation they occur in the image, the image transformation step can be omitted. Instead, the extracted feature points and direction vectors themselves can be transformed to obtain a precomputed set of models for all possible transformations. This model generation method is displayed in FIG. 6. Steps (1)–(3) of the alternative model generation method are identical to the normal model generation method of FIG. 5. The difference is that the feature extraction is now performed only once for every discretization level (4). Then, with steps (5)–(7), the model points and direction vectors are transformed with all possible transformations for the current level of discretization and stored in memory. While several particular embodiments of the invention have been described in detail, various modifications to the preferred embodiments can be made without departing from the scope of the invention.

What is claimed is:

1. A method for recognizing model object in a first image comprising the steps of:

(a) acquiring in electronic memory the first image of the model object;

(b) transforming the first image of the model object into a multi-level representation consistent with a recursive subdivision of a search space, said multi-level representation including at least the first image;

(c) generating at least one precomputed model of the model object for each level of discretization of the search space, said precomputed model consisting of a plurality of model points with corresponding direction vectors, said model points and direction vectors being generated by an image processing operation that returns a direction vector for at least each model point;

(d) acquiring in electronic memory a current image;

(e) transforming the current image into a multi-level representation consistent with a recursive subdivision of the search space, said multi-level representation including at least the current image;

(f) performing an image processing operation on each transformed image of the multi-level representation that returns a direction vector for a subset of model points within said current image that corresponds to the range of translations for which the at least one precomputed model should be searched;

(g) computing a match metric that uses the direction information of the at least one precomputed model and the transformed image for all possible model poses of the at least one precomputed model in the coarsest discretization level of the search space;

(h) determining those model poses whose match metric exceeds a user-selectable threshold and whose match metric is locally maximal, and generating a list of instances of the at least one precomputed model in the coarsest discretization level of the search space from said model poses and said match metrics;

(i) tracking said instances of the at least one precomputed model in the coarsest discretization level of the search space through the recursive subdivision of the search space until a finest level of discretization is reached; and (j) providing the model pose of the instances of the model object on the finest level of discretization.

2. A method for recognizing a model object in a first image comprising the steps of:

(a) acquiring in electronic memory the first image of the model object;

(b) transforming the first image of the model object into a multi-level representation consistent with a recursive subdivision of a search space, said multi-level representation including at least the first image;

(c) generating at least one precomputed model of the model object for each level of discretization of the search space, said precomputed model consisting of a plurality of model points with corresponding direction vectors, said model points and direction vectors being generated by an image processing operation that returns a direction vector for at least each model point;

(d) acquiring in electronic memory a current image;

(e) transforming the current image into a multi-level representation consistent with a recursive subdivision of the search space, said multi-level representation including at least the current image;

(f) performing an image processing operation on each transformed image of the multi-level representation that returns a direction vector for a subset of model points within said current image that corresponds to the range of translations for which the at least one precomputed model should be searched;

(g) computing a match metric that uses the direction information of the at least one precomputed model and the transformed image for all possible model poses of the at least one precomputed model in the coarsest discretization level of the search space;

(h) determining those model poses whose match metric exceeds a user-selectable threshold and whose match metric is locally maximal, and generating a list of instances of the at least one precomputed model in the coarsest discretization level of the search space from said model poses and said match metrics;

(i) tracking said instances of the at least one precomputed model in the coarsest discretization level of the search space through the recursive subdivision of the search space until a finest level of discretization is reached; and (j) providing the model pose of the instances of the model object on the finest level of discretization;

wherein in step (c) for each level of discretization according to step (b), and for each transformation in the discretized search space at the current level of discretization according to step (b) the following steps are performed:

(c1) transforming the first image of the current level of discretization by the current transformation using antialiasing methods;

(c2) performing feature extraction in the transformed image to generate at least one feature points; and (c3) adding any segmented feature points along with their direction vectors to the list of instances of the at least one precomputed model.

3. The method of claim 1, wherein for each level of the discretization according to step (b) the following steps are performed:

(c1) performing feature extraction in the first image of the current level of discretization, and for each transformation in the discretized search space at the current level of discretization:

(c2) transforming the extracted model points and direction vectors by the current transformation; and (c3) adding all transformed model points along with their transformed direction vectors to the list of instances of the at least one precomputed model.

4. The method of claim 2, wherein step (i) is followed by the following step:

(i') discarding overlapping and/or extraneous instances from the list of instances.

5. The method of claim 3, wherein step (i) is followed by the following step:

(i') discarding overlapping and/or extraneous instances from the list of instances.

6. The method of claim 4, wherein step (i') is followed by the following step:

(ii'') refining the pose information to a resolution higher than the finest discretization level.

7. The method of claim 6, wherein (ii'') further comprises the step of extrapolating the maxima of the match metric.

8. The method of claim 7, wherein (ii'') is followed by the following steps to further refine the model pose:

(iii''') extracting feature points in at least the first image;

(iv''') robustly finding the correspondences between model points and feature points; and (v''') minimizing the average distance of the model points to the feature points using a least-squares fitting algorithm.

9. The method of claim 7, wherein each of the steps (c) and (f) further comprises the step of performing feature extraction in the transformed image representation.

10. The method of claim 9, wherein at least one of line filtering, edge filtering, corner detection, and region-based segmentation is used for the feature extraction.

11. The method of claim 10, wherein in step (g) the sum of the dot product of the direction vectors of the transformed model and the first image over all model points of the at least one precomputed model is used for computing said match metric.

12. The method of claim 10, wherein the sum of the normalized dot product of the direction vectors of the transformed model and the first image over all model points of the at least one precomputed model is used for computing said match metric.

13. The method of claim 10, wherein the absolute value of the sum of a normalized dot product is used for computing said match metric.

14. The method of claim 10, wherein the sum of the absolute values of a plurality of normalized dot products is used for computing said match metric.

15. The method of claim 10, wherein in step (g) the sum of the absolute values of the angles that the direction vectors in the at least one precomputed model and the direction vectors in the first image is used for computing said match metric and where the local minima of the match metric are used to extract the pose information instead of the local maxima.

16. The method of claim 12, wherein the contribution of direction vectors that are caused by noise is discarded.

17. The method of claim 13, wherein the contribution of direction vectors that are caused by noise is discarded.

18. The method of claim 14, wherein the contribution of direction vectors that are caused by noise is discarded.

19. A system for recognizing model object in a first image comprising:

(a) means for acquiring in electronic memory a first image of the model object;

(b) means for transforming the fist image of the model object into a multi-level representation consistent with a recursive subdivision of a search space, said multi-level representation including at least the first image;

(c) means for generating at least one precomputed model of the model object for each level of discretization of the search space, said precomputed model consisting of a plurality of model points with corresponding direction vectors, said model points and direction vectors being generated by an image processing operation that returns a direction vector for at least each model point;

(d) means for acquiring in electronic memory a current image;

(e) means for transforming the current image into a multi-level representation consistent with a recursive subdivision of the search space, said multi-level representation including at least the current image;

(f) means for performing an image processing operation on each transformed image of the multi-level representation that returns a direction vector for a subset of model points within said current image that corresponds to the range of translations for which the at least one precomputed model should be searched;

(g) means for computing a match metric that uses the direction information of the at least one precomputed model and the transformed image for all possible model poses of the at least one precomputed model in the coarsest discretization level of the search space;

(h) means for determining those model poses whose match metric exceeds a user-selectable threshold and whose match metric is locally maximal, and generating a list of instances of the at least one precomputed model in the coarsest discretization level of the search space from said model poses and said match metrics;

(i) means for tracking said instances of the at least one precomputed model in the coarsest discretization level of the search space through the recursive subdivision of the search space until a finest level of discretization is reached; and (j) means for providing the model pose of the instances of the model object on the finest level of discretization.

20. A computer program product comprising program code means stored on a computer readable medium for performing the method of claim 1 when said computer program product is run on a computer.

* * * * *

UNITED STATES PATENT AND TRADEMARK OFFICE
CERTIFICATE OF CORRECTION

PATENT NO. : 7,062,093 B2
APPLICATION NO. : 09/965236
DATED : June 13, 2006
INVENTOR(S) : Carsten Steger It is certified that error appears in the above-identified patent and that said Letters Patent is hereby corrected as shown below:

On the Title Page (73) delete "MVTECH" and insert therefor -- MVTec --.

On the Title Page (75), in the inventor's name,

"Carstan" should read --Carsten--.

Column 2, line 5, "ϕ" should read -- φ --.

Column 2, line 21, "ϕ" should read -- φ --.

Column 2, line 24, "ϕ" should read -- φ --.

Column 10, lines 10-14, the lower portion of the equation after the second "=" should read:

$$\frac{1}{n}\sum_{i=1}^{n}\frac{d_i'^x e^x_{x+p_i'^x,y+p_i'^y} + d_i'^y e^y_{x+p_i'^x,y+p_i'^y}}{\sqrt{(d_i'^x)^2 + (d_i'^y)^2} \cdot \sqrt{(e^x_{x+p_i'^x,y+p_i'^y})^2 + (e^y_{x+p_i'^x,y+p_i'^y})^2}}$$

Column 11, line 55, "$\phi_{min} \leq \phi \leq \phi_{max}$" should read:

--$\omega_{min} \leq \omega \leq \omega_{max}$ --

Column 13, line 6, "ϕ" should read -- φ --.

Column 14, line 40, "Δω" should read -- Δφ --.

Column 16, line 25, "ϕ" should read -- φ --.

Column 16, line 44, "ϕ" should read -- φ --.

Column 16, line 46, "ϕ" should read -- φ --.

UNITED STATES PATENT AND TRADEMARK OFFICE
CERTIFICATE OF CORRECTION

PATENT NO. : 7,062,093 B2
APPLICATION NO. : 09/965236
DATED : June 13, 2006
INVENTOR(S) : Carsten Steger It is certified that error appears in the above-identified patent and that said Letters Patent is hereby corrected as shown below:

Column 18, line 1-4, the equation should read:

$$\frac{1}{m}\sum_{j=1}^{m}\left\|Aq_j + t - r_j\right\| \to \min$$

Column 21, line 31, "$\phi_{min} \leq \phi \leq \phi_{max}$" should read:

-- $\omega_{min} \leq \omega \leq \omega_{max}$ --

Column 22, line 48, "$\phi$" should read -- $\varphi$ --.

Signed and Sealed this

Twenty-fifth Day of September, 2007

JON W. DUDAS
*Director of the United States Patent and Trademark Office*